(12) United States Patent
Dorner et al.

(10) Patent No.: US 6,769,188 B2
(45) Date of Patent: Aug. 3, 2004

(54) PENDULUM SCROLL SAW

(75) Inventors: Stefan Dorner, Kaufbeuren (DE); Konstantin Baxivanelis, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 5 days.

(21) Appl. No.: 10/205,638

(22) Filed: Jul. 24, 2002

(65) Prior Publication Data

US 2003/0019112 A1 Jan. 30, 2003

(30) Foreign Application Priority Data

Jul. 26, 2001 (EP) ............................................ 01810739

(51) Int. Cl.$^7$ ............................................... B23D 49/10
(52) U.S. Cl. ......................................... 30/392; 30/393
(58) Field of Search ................................... 30/392–394

(56) References Cited

U.S. PATENT DOCUMENTS

| 1,621,103 | A | | 3/1927 | Brummell |
| 2,206,614 | A | | 7/1940 | O'Hern |
| 4,272,996 | A | * | 6/1981 | Sauerwein ..................... 74/50 |
| 4,385,443 | A | | 5/1983 | O'Banion |
| 5,755,292 | A | | 5/1998 | Nilsson |

* cited by examiner

Primary Examiner—Douglas D. Watts
(74) Attorney, Agent, or Firm—Sidley Austin Brown & Wood, LLP

(57) ABSTRACT

A pendulum scroll saw including a lifting rod (1) for securing a saw blade (2), and a motor-driven entrain member (3) for reciprocating the lifting rod (1) with the lifting rod (1) having a guide surface (4) connectable with the entrain member (3), and with a contact region of the guide surface (4) with the entrain member (3) having a curved profile that deviates from a straight line.

5 Claims, 3 Drawing Sheets

PENDULUM SCROLL SAW

BACKGROUND OF THE INVENTION

1. Field of the Invention

The present invention relates to a pendulum scroll saw and, in particular, to a compass saw having a lifting rod for securing a saw blade, an entrain member for reciprocating the lifting rod and a motor for pivoting the entrain member about a rational axis, the lifting rod having a guide surface connectable with the entrain member.

2. Description of the Prior Art

Pendulum scroll saws of the type described above find their application in cut-off processes. A saw blade is releasably attached to a lifting rod that performs a pendulum—like reciprocating movement. For transforming a rotational movement of a motor into pendulum—like reciprocating movement, the lifting rod is provided with a crank. In one of the reciprocating directions of the lifting rod, the saw blade performs a sawing stroke, cutting the material, and performs an idle stroke in the opposite direction. During the idle stroke, no cutting of the material, e.g., wood or plastic, takes place.

German Publication DE-128 19 527 discloses a pendulum scroll saw with a motor-driven lifting rod. At one of its end, the lifting rod is provided with a tool holder for receiving a blade of a compass saw and is provided at its opposite end with a flat section having a guide opening. An eccentrically rotatable entrain member is arranged in'the guide opening. The entrain member has a guide surface that contacts the lifting rod in particular the edge of the guide opening. The guide surface extends transverse to the reciprocating direction of the lifting rod and transverse to the rotational axis of the entrain member.

The advantage of the known solution consists in a constructively easy transformation of the circular movement of the entrain member in a linear movement. This provides for an economical manufacturing of the pendulum scroll saws.

The drawback of the known solution consists in that the linear movement has a sinusoidal speed gradient. The drawback of the sinusoidal speed gradient consists in that, on one hand, the saw blade has a variable sinusoidal speed and, on the other hand, the duration of the idle stroke corresponds to the duration of the sawing stroke. These two factors lead to an unsatisfactory sawing output of a pendulum scroll saw and to a prohibitive idle time.

Accordingly, an object of the present invention is to provide a pendulum scroll saw of the type described above and having a high sawing output and, which at the same time, can be economically manufactured.

SUMMARY OF THE INVENTION

This and other objects of the present invention, which will become apparent hereinafter, are achieved by providing a pendulum scroll saw of the type described above and in which the contact region of the guide surface with the entrain member has a curved profile that deviates from a straight line.

The deviation of the curved profile of the contact region of the guide surface with the entrain member from a straight line in a direction transverse to the reciprocating direction, permits, on one hand, to optimize the durations of the idle and sawing strokes and, on the other hand, to optimize the speed gradient, in particular, during the sawing stroke. The deviation of the contact region from a straight line, in a direction transverse to the reciprocating direction, permits to eliminate a sinusoidal speed gradient of the lifting rod and, thereby, of the saw blade.

The guide surface provides for displacement of the entrain member, during the sawing stroke, relative to the lifting rod, advantageously along a substantially rigid monotonous falling convex or rising concave curve. A so formed guide surface insures a high output capacity of the pendulum scroll saw. In addition, the duration of the idle stroke is smaller than that of the sawing stroke, which increases the service or useful time of the saw and the efficiency of the cutting process. During the idle stroke, advantageously, a guide surface, which has the same profile, is used. This insures an economical manufacture of the pendulum scroll saw.

In order to insure a uniform speed gradient, at least during the sawing stroke, the curved profile corresponds preferably to a polynom of $n^{th}$ degree. This profile of the guide surface provides for a substantially optimal and continuous speed gradient.

Advantageously, the curved profile corresponds to a polynom of second degree, which on one hand, insure a substantially uniform speed during the sawing stroke and, on the other hand, insure a simplest shape of the lifting rod.

The novel features of the present invention, which are considered as characteristic for the invention, are set forth in the appended claims. The invention itself, however, both as to its construction and it mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
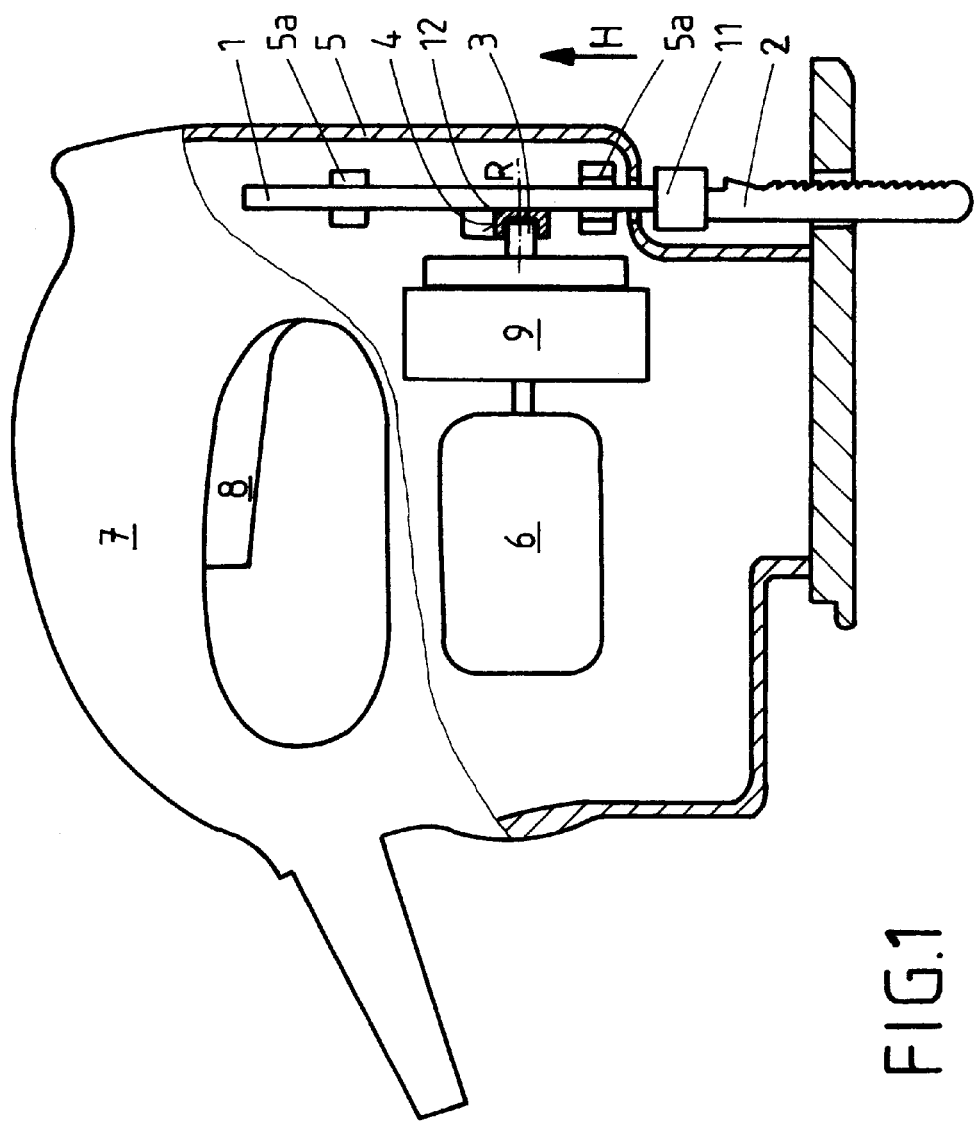
FIG. 1 shows a schematic cross-sectional view of a pendulum scroll saw with a lifting rod.
Figure 2:
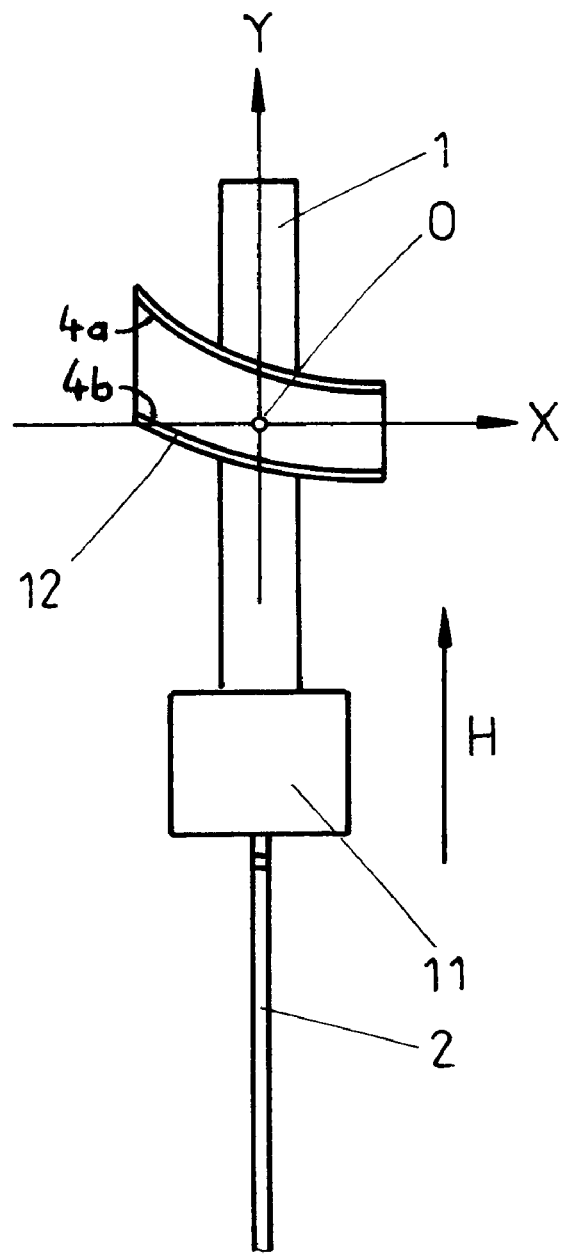
FIG. 2 shows a side view of the lifting rod at an increased scale.
Figure 3:
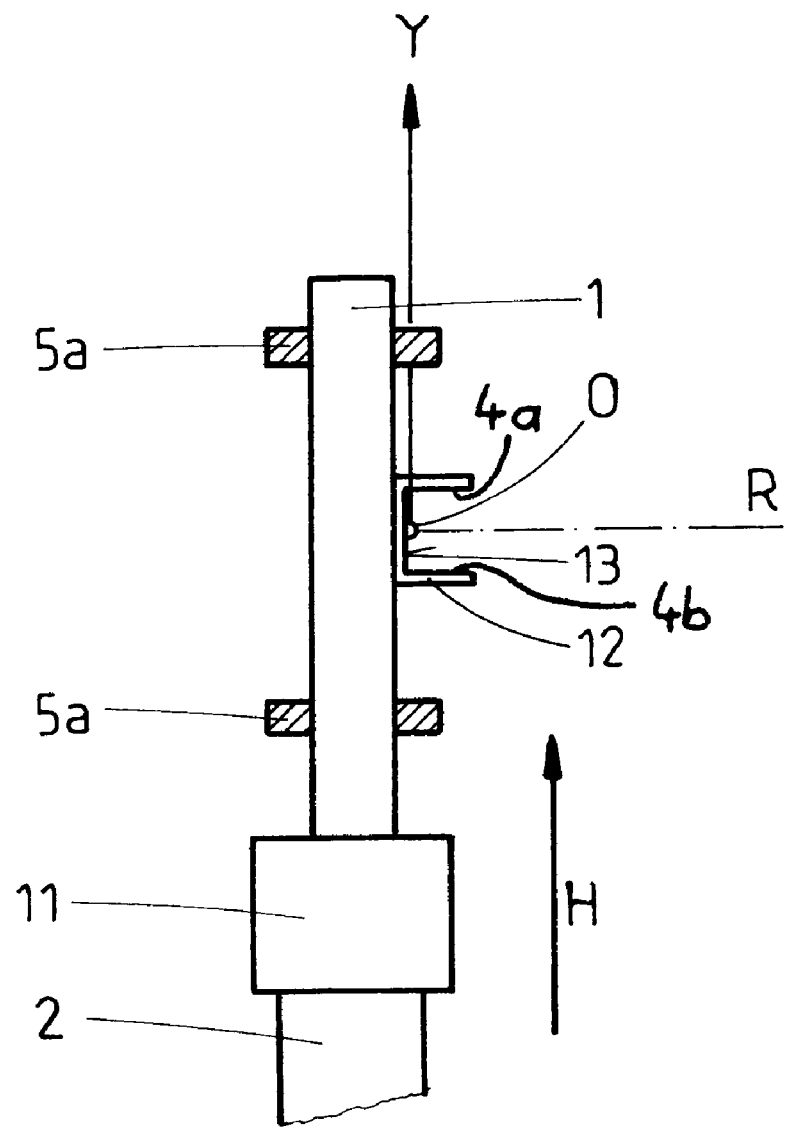
FIG. 3 shows a side view of the lifting rod shown in FIG. 2 but pivoted by 90°.

A pendulum scroll saw according to the present invention, which is shown in FIGS. 1–3, has a lifting rod 1 for securing a saw blade 2. The lifting rod 1 has a guide surface 4 associated with an entrain member 3 pivotable about a rotational axis R. For supporting the lifting rod 1 and a motor 6, which drives the entrain member 3, the pendulum saw has a housing 5 provided with a support arm 5a which is fixedly connected with the housing 5.

For guiding the saw, the housing 5 is provided with a handle 7 formed integrally with the housing 5. At the lower portion of the handle 7, there is provided a switch 8 for turning the motor 6 on and off. The motor 6 drives, via gearing 9, the entrain member 3 which provides for a pendulum—like movement of the lifting rod 1 in a lifting direction H.

The lifting rod 1 has a substantially cylindrical outer profile. At one of its end, the lifting rod 1 is provided with a tool holder 11 for releasably securing the saw blade 2. At its apposite end region, the lifting rod 1 is provided with a crank 12 having the guide surface 4. The crank 12 has a substantially U-shaped cross-section and is formed, e.g., as a bent stamped part.

To precisely describe the curvature of the guide surface 4, the lifting rod 1, which is shown in FIG. 1, is shown in FIGS. 2–3 with cartesian coordinates the nill point O of which is defined by a point of intersection of an outer profile 13 of the crank 12 with the rotational axis R. The nill point O defines a nill position of the lifting rod 1. The nill position of the lifting rod 1 represent a position relative to which the lifting rod 1 performs a pendulum movement. A positive section of the Y-axis extends in the lifting direction H in which the lifting of the saw blade 2 is effected. The X-axis extends perpendicular to the rotational axis R and perpendicular to the Y-axis. The X-axis is so oriented that the entrain member 3 moves from the positive section of the X-axis directly to the positive section of the Y-axis. The pivot angle α of the entrain member 3 is measured from the positive section of the X-axis.

The guide surface 4 is formed of two curved profiles 4a and 4b which have, with reference to the cartesian coordinates, a parabolic shape as particularly shown FIG. 2. Naturally, the curve can be a polynom of n degree, such as, e.g., $y=a*x^n+b*x^{(n-1)}+ \ldots c$.

Though the present invention was shown and described with references to the preferred embodiment, such is merely illustrative of the present invention and is not to be construed as a limitation thereof, and various modifications to the present invention will be apparent to those skilled in the art. It is, therefore, not intended that the present invention be limited to the disclosed embodiment or details thereof, and the present invention includes all of variations, and/or alternative embodiments within the spirit and scope of the present invention as defined by the appended claims.

What is claimed is:

1. A pendulum scroll saw, comprising a lifting rod (1) for securing a saw blade (2); an entrain member (3) for reciprocating the lifting rod(1); and a motor (6) for pivoting the entrain member (3) about a rotational axis (R), the lifting rod (1) having a guide surface (4) connectable with the entrain member (3), with a contact region of the guide surface (4) with the entrain member (3) being formed by two curved profiles (4a, 4b) each deviating rigidly, monotonously from a straight line.

2. A pendulum scroll saw according to claim 1, wherein one of the curved profiles 4(a), upon execution of a saw stroke, with reference to the lifting rod (1), assumes a profile of a substantially rigid monotonously falling convex curve.

3. A pendulum scroll saw according a claim 1, wherein another of the curved profiles (4b), upon execution of a saw stroke, with reference to the lifting rod (1), assumes a profile of a substantially rigid monotonously rising concave curve.

4. A pendulum scroll saw according to claim 1, wherein each curved profile (4a, 4b) corresponds to a polynom of $n^{th}$ degree.

5. A pendulum scroll saw according to claim 1, wherein each curved profile (4a, 4b) corresponds to a polynom of second degree.

* * * * *